United States Patent
Saint Etienne et al.

(10) Patent No.: US 7,379,995 B2
(45) Date of Patent: May 27, 2008

(54) PROCESS FOR CHECKING THE DETERMINISTIC BEHAVIOR OF A PACKET SWITCHING NETWORK

(75) Inventors: Jean-François Saint Etienne, Cugnaux (FR); Juan Lopez, Toulouse (FR); Dominique Portes, Auzeville-Tolosane (FR); Eddie Gambardella, Blagnac (FR); Bruno Pasquier, Thil (FR); Philippe Almeida, Cugnaux (FR)

(73) Assignee: Airbus France, Toulouse Cedex (FR)

( * ) Notice: Subject to any disclaimer, the term of this patent is extended or adjusted under 35 U.S.C. 154(b) by 786 days.

(21) Appl. No.: 10/288,025

(22) Filed: Nov. 4, 2002

(65) Prior Publication Data

US 2003/0149788 A1 Aug. 7, 2003

(30) Foreign Application Priority Data

Nov. 5, 2001 (FR) ................................. 01 14261

(51) Int. Cl.
- *G06F 15/16* (2006.01)
- *G06F 15/173* (2006.01)
- *G06F 11/00* (2006.01)

(52) U.S. Cl. ............... 709/224; 709/234; 370/229; 370/252

(58) Field of Classification Search ........... 709/224, 709/234; 370/229, 252
See application file for complete search history.

(56) References Cited

U.S. PATENT DOCUMENTS

2003/0048754 A1* 3/2003 Bruckman ............... 370/252

FOREIGN PATENT DOCUMENTS

EP 0579472 * 1/1994

OTHER PUBLICATIONS

Bennett et al., "Delay Jitter Bounds and Packet Scale Rate Guarantee for Expedited Forwarding", 2001, IEEE, INFOCOM 2001, pp. 1502-1509.

(Continued)

*Primary Examiner*—Jason D Cardone
*Assistant Examiner*—Tanim Hossain
(74) *Attorney, Agent, or Firm*—Thelen Reid Brown Raysman & Steiner LLP

(57) ABSTRACT

The invention relates to a process for checking the deterministic behavior of a packet switching network comprising subscriber stations connected to each other through at least one switch, this behavior being said to be deterministic in the sense that every packet sent on the network from a source subscriber station joins the destination subscriber station(s) within a limited time, characterized in that the following relation is satisfied for each output port on each switch on the network:

$$\sum \left[1 + \text{int}\left(\frac{(\text{Jitter In})_i\, i + \text{max Latency}}{BAGi}\right)\right] * (\text{max frame duration}) \le \text{max latency}$$

$i$ = number of virtual links passing through the buffer in which:

the max latency value is the maximum residence time in the output buffer of a switch, this value may be different for each switch in the network.

BAGi is the minimum time between two consecutive frames belonging to a vertical link i, before they are transmitted on the physical support.

(Jitter In) i is the Jitter associated with a virtual link i that represents the time interval between the theoretical instant at which a frame is transmitted, and its effective transmission which may be before or after the theoretical instant.

(max frame duration) i is the duration of the longest frame on the virtual link i.

2 Claims, 5 Drawing Sheets

OTHER PUBLICATIONS

Chang et al., "Guaranteed Quality-of-Service Wireless Medium Access by Packet-by-Packet Generalized Processor Sharing Algorithm", 1998, IEEE, pp. 493-497.

Cruz, Rene L., "A Calculus for Network Delay, Part I: Network Elements in Isolation", Jan. 1991, IEEE Transactions on Information Theory, vol. 37, No. 1, pp. 114-131.

Cruz, Rene L., "A Calculus for Network Delay, Part II: Network Analysis", Jan. 1991, IEEE Transactions on Information Theory, vol. 37, No. 1, pp. 132-141.

Cruz, R. L., "SCED+: Efficient Management of Quality of Service Guarantees", 1998, IEEE, pp. 625-634.

* cited by examiner

PROCESS FOR CHECKING THE DETERMINISTIC BEHAVIOR OF A PACKET SWITCHING NETWORK

This application is claims priority of French application no. 01 14261 which was filed on Nov. 5, 2001, and was not published in English.

DESCRIPTION

1. Technical Field

This invention relates to a process for checking the deterministic behavior of a packet switching network, particularly in avionics.

2. State of Prior Art

The processes described in documents according to prior art, references [1], [2] and [3] at the end of this description, are based on statistical considerations adapted to land telecommunication networks, but which are not easily adapted for an aircraft.

The purpose of this invention is to check that a packet switching network actually has a deterministic behavior, particularly in avionics.

PRESENTATION OF THE INVENTION

The invention proposes a process for checking the deterministic behavior of a packet switching network comprising subscriber stations connected to each other through at least one switch, this behavior being said to be deterministic in the sense that any packet sent on the network from a source subscriber station reaches the destination subscriber station(s) within a duration that is limited in time, and characterized in that the following relation is satisfied for each output port from each switch on the network:

$$\sum \left[ 1 + \text{int}\left( \frac{(\text{Jitter In})_i i + \max \text{Latency}}{BAGi} \right) \right] * (\max \text{ frame duration}) \leq \max \text{ latency}$$

$i$ = number of virtual links passing through the buffer in which:
- the max latency value is the maximum residence time in the output buffer of a switch, this value may be different for each switch in the network.
- BAGi is the minimum time between two consecutive frames belonging to a vertical link i, before they are transmitted on the physical support.
- (Jitter In)i is the Jitter associated with a virtual link i that represents the time interval between the theoretical instant at which a frame is transmitted, and its effective transmission which may be before or after the theoretical instant.
- (max frame duration) i is the duration of the longest frame on the virtual link i.

In another embodiment, virtual links are added one by one, checking that the behavior of the entire network actually remains deterministic after each addition of a virtual link.

In avionics, the invention solves a security requirement that is of prime importance for the transport of information on an aircraft, called "determinism". It is essential that data is actually received within a maximum time after being sent to a destination, and this maximum time must be known.

The process according to the invention has the advantage that it is extremely easy to use (only one equation for each output port). It is analytic and requires only very little information about the network characteristics (maximum latency per switch, BAG and subscriber jitter).

The invention is useful for all packet switching networks for which a particularly service quality is required in terms of information routing guarantee, for example "Fast Ethernet", ATM ("Asynchronous Transfer Mode"), etc.

Preferred applications are aeronautics (civil and military), space, marine and nuclear.

DETAILED DESCRIPTION OF EMBODIMENTS

The invention relates to a process for checking the deterministic behavior of a packet switching network. This process guarantees that such a network has a deterministic behavior, in the sense that any packet sent on the network from a source node reaches the destination node(s) within a duration that is limited in time. Such a process is applicable to all networks based on packet switching or frame switching or cell switching. It makes it possible to be certain that the configuration of a network through switch routing tables and the frame flows passing through the switches, is conform with a deterministic behavior.

In the remainder of the description, an end system refers to a node in a network capable of generating and receiving frames but which is not an intermediate node (switch, router, gateway, etc.) that is designed to route the frames in the network. When an intermediate node is the source of a flow of frames addressed to one or several end systems, it behaves like an end system.

A virtual link (VL) is a logical connection between a source end system and one or several destination end systems.

Each virtual link has a specific value called the Bandwidth Allocation Gap (BAG), which has one second as its unit, which represents the minimum time separating two consecutive frames belonging to the virtual link in question and before they are sent on the physical support.

Figure 1:
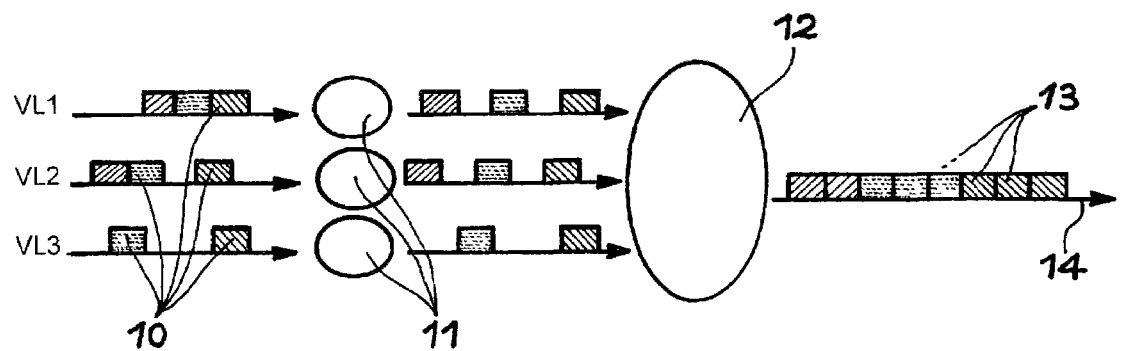
FIG. 1 illustrates a model of an end system.

A model of an end system is shown in FIG. 1. The input is irregular flows of packets 10 from applications (asynchronous flows between virtual links VL1, VL2, VL3). Packet flows are then regulated by means of regulators 11 each corresponding to a virtual link in order to separate packets in BAG gaps. A multiplexer 12 then outputs a flow of frames 13 on the physical support 14.

The jitter associated with a virtual link represents the time interval between the theoretical moment at which a frame is transmitted (relative to the BAG) and when it is actually transmitted, that may be before or after the theoretical instant.

The flow of frames in a virtual link is entirely characterized by the (BAG, max Jitter) pair, in which max jitter is the maximum value of the instantaneous jitter than can be obtained for this virtual link.

The term jitter refers to the max jitter throughout the remainder of this document.

Figure 2:
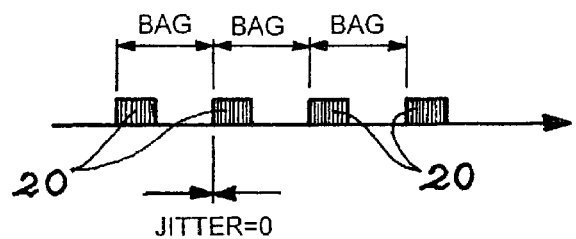
FIG. 2 illustrates jitter for a regular flow.

For a virtual link for which the flow is maximum (always one frame to be sent) and regular, there is one frame 20 precisely at each BAG gap as shown in FIG. 2. The jitter associated with this virtual link is zero.

In the general case, the start of the frame transmission may occur at any position within the jitter gap. If the frame 1 is delayed as it passes through the switch, and then a few instants later frame 2 in the same virtual link is only slightly delayed, the BAG value is no longer respected. Therefore the flow of frames in the same virtual link has a certain jitter relative to the BAG value.

Figure 3A:
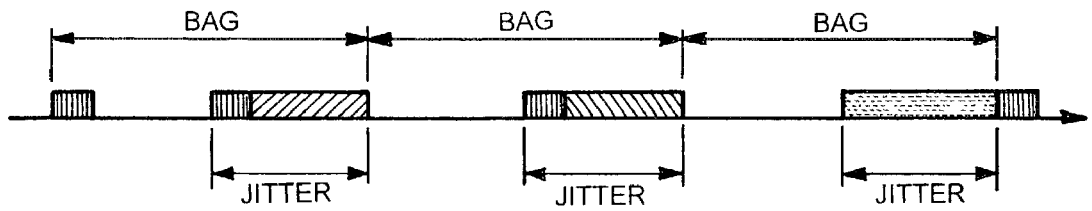
FIGS. 3A to 3C illustrate the position of frames within their jitter window.
Figure 3B:
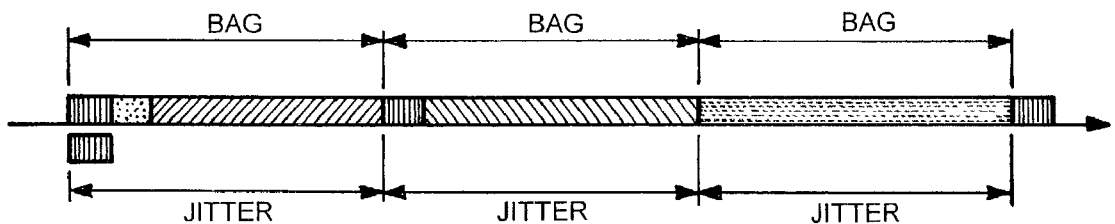
Figure 3C:
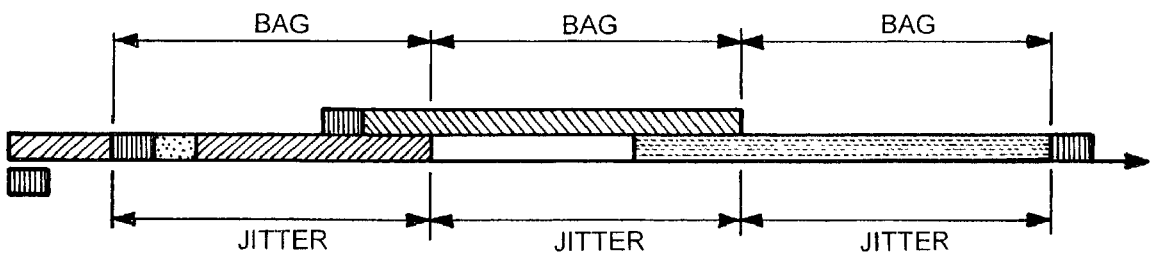

The three cases illustrated in FIGS. 3A, 3B and 3C show the position of the frames within their jitter window.

FIG. 3A illustrates the case in which Jitter<BAG.

FIG. 3B illustrates the case in which Jitter=BAG. When Jitter=BAG, there is a purely theoretical possibility that a frame will be overlapped by another frame that is very early. Since the transmission order is guaranteed, this possibility is prohibited since a frame transmitted after another frame cannot overlap or be later than the other frame. Therefore, the two frames appear side by side (called frame bursts).

FIG. 3C illustrates the case in which Jitter>BAG. Jitters mutually overlap and frame 2 is transmitted immediately after frame 1. There is a burst.

The jitter associated with each virtual link at the output from an end system, which is equal to Jitter ES, is equal to the contention that takes place at the output from the end system in which several regulated flows want to access the same FIFO (First In-First Out) output register. Its value depends on a number of variables including the number of virtual links connected to the end system.

Thus, all virtual links output from an end system have the (BAG, Jitter ES) characteristic.

Figure 4:
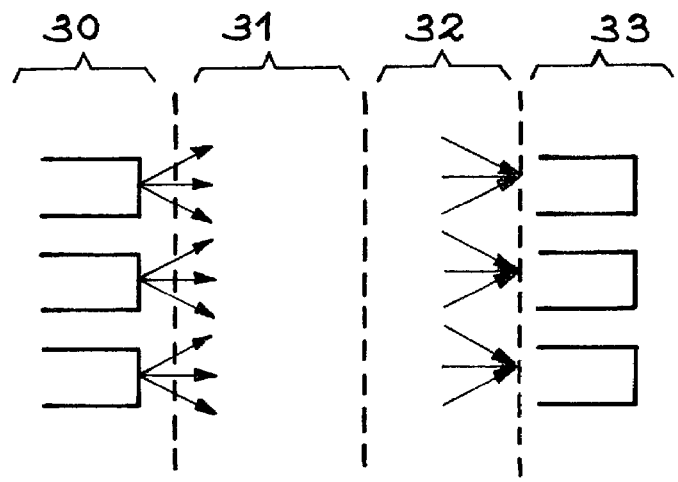
FIG. 4 illustrates a switch model.

A switch model is illustrated in FIG. 4, with input buffers 30, a demultiplexer 31, a multiplexer 32 and output buffers 33.

According to this model, it can be seen that there will be "more or less" contention for access to the output ports, depending on the configuration of the switch (forwarding table) and the flow characteristics of virtual links arriving in the input ports. The effect of this contention is to generate delays and therefore pollution on the flow characteristic of each virtual link at the output ports.

Depending on the instantaneous load of a switch, a frame may either remain in the switch for a minimum time (minimum latency) or remain in it for a maximum time (maximum latency of the switch) or remain in it for any intermediate duration.

If the flow characteristic of a virtual link input into the switch is (BAG, Jitter In), then the magnifying disturbance generated by the switch will introduce a new characteristic for the flow in the same virtual link at the output from the switch: (BAG, Jitter Out) where Jitter Out=Jitter In+max latency.

In order to demonstrate determinism, it is necessary to size the output buffers such that no frames are lost, using a given switch configuration as a starting point together with the characteristics of the virtual links passing through the switch.

For a given virtual link with the (BAG, Jitter In) characteristic, the formula giving the maximum number of frames associated with this virtual link that can take place during a sliding window FG with a duration of T seconds, is:

$$N=1+\text{int}(\text{Jitter In}+T/\text{BAG})\text{unit}=\text{frames per sliding window } T$$

where the function int(x) returns the integer part of x (to round to the next lowest integer)

for x from [0, 1[, int(x)=0
for x from [1, 2[, int(x)=1

Figure 5A:
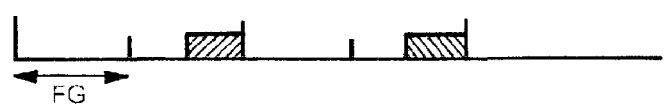
FIGS. 5A to 5G illustrate the position of the sliding window for an example (BAG, Jitter In).

For example, if the reference interval T=1 ms is used, this formula implies:

BAG+2 ms/Jitter In=0.5 ms=>1+int((0, 5+1)/2)=1 frame max/ms (see FIG. 5A).

Figure 5B:
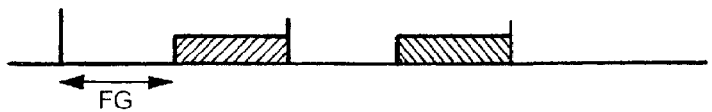

BAG=2 ms/Jitter In=1 ms=>1+int((1+1)/2)=2 frames max/ms (see FIG. 5B). In this case, two frame transmission events may take place during 1 ms and therefore two complete frames may be located in the buffer (we might thought that there would only be one frame during 1 ms).

Figure 5C:
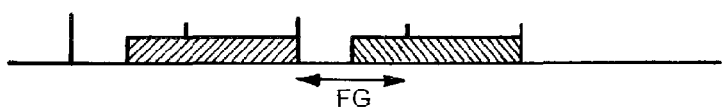

BAG=2 ms/Jitter In=1.5 ms=>1+int((1.5+1)/2)=2 max frame 2 frames max/ms (see FIG. 5C)

Figure 5D:
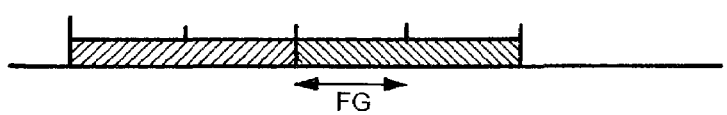

BAG=2 ms/Jitter In=2 ms=>1+int((2+1)/2=2 frames max/ms (see FIG. 5D)

Figure 5E:
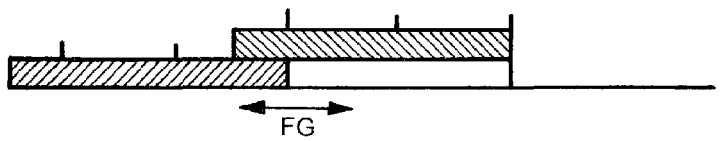

BAG=2 ms/Jitter In=2.5 ms=>1+int((2.5+1)/2=2 frames max/ms (see FIG. 5E)

Figure 5F:
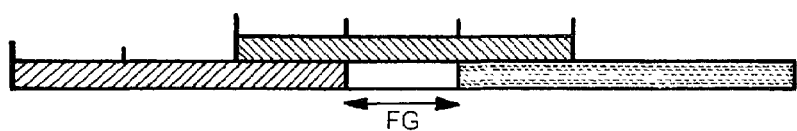

BAG=2 ms/Jitter In=3 ms=>1+int((3+1)/2)=3 frames max/ms (see FIG. 5F)

Figure 5G:
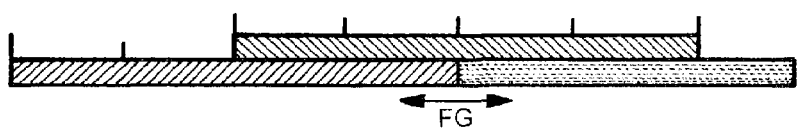

BAG=2 ms/Jitter In=4 ms=>1+int((4+1)/2)=3 frames max/ms (see FIG. 5G).

To prevent congestion of a switch output buffer so that frames will never be lost, a switch is necessary for each output port and the following relation must be satisfied for all switches in the network.

$$\sum \left[1+\text{int}\left(\frac{(\text{Jitter In})_i + \text{max Latency}}{BAGi}\right)\right] * (\text{max frame duration}) \leq \text{max latency}$$

$i$ = number of virtual links passing through the buffer

The max latency value is the maximum residence time in a switch output buffer and it may be different for each switch in the network. The left part represents the duration of all frames of all virtual links that can reside in a switch output buffer and using the max latency time as the sliding window. If this relation is satisfied, there is no congestion and the flow characteristic of a virtual link is transformed from (BAG, Jitter In) to (BAG, Jitter Out=Jitter In+max latency). In other words, the switch configuration agrees with the performances of the switch (max latency).

Application to a Simple Network

Figure 6:
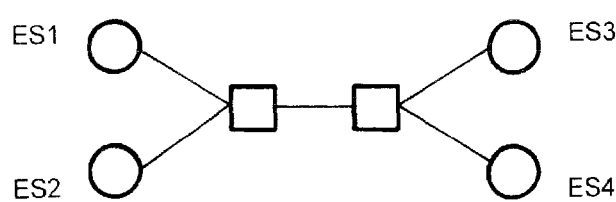
FIG. 6 illustrates an example topology.

FIG. 6 illustrates a topology. It is considered that each end system ES1, ES2, ES3 or ES4 has virtual links that lead to all other end systems ("broadcast" case). Each end system has an identical number Ni of virtual links with characteristics BAG=2 ms and Jitter ES=0.5 ms.

Figure 7:
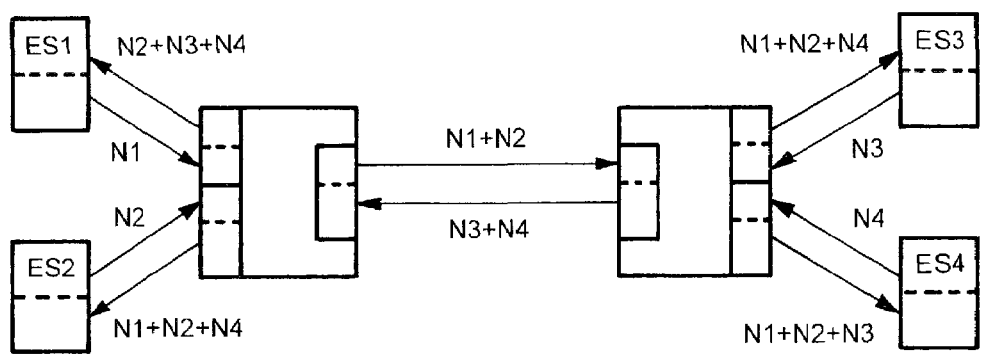
FIG. 7 illustrates the number of virtual links for the topology illustrated in FIG. 6.

FIG. 7 shows a diagram representing the number Ni of virtual links on each simple link.

The calculations are as follows:

On the two central links:
N1[1+int((0,5+1)/2]*15.52+N2[1+int((0.5+1)/2]
   *15.52<1000 µs
(N1+N2)*15.52<1000 µs Similarly on the other link:
(N3+N4)*15.52<1000 µs The formula for the uplink to ES1 is:
N2[1+int((0,5+1)/2]*15.52+N3[1+int((1.5+1)/2)]
   *15.52*N4[1+int((1.5+1)/2]*15.52<1000 µs
N2*15.52+2*(N3+N4)15.52<1000 µs The other uplinks are similar, with appropriate end systems. We also have the equation: N1=N2=N3=N4, in which 5.N1.15.52<1000 µs.
N1=N2=N3=N4=12 virtual links.

Therefore the number of virtual links on an uplink to an end system is 3*12=36 virtual links. A frame size of 174 bytes gives a physical flow for a virtual link with BAG=2 ms equal to 1000/2*(174+20)8*=776 000 bit/s. This gives 36 virtual links corresponding to a physical flow of 36*776 000=27.936 Mbits/s.

It can be seen that most of the disturbance generated by a chosen switch has divided the theoretical physical flow that would have occurred on the link (100 Mbits/s) by more than 3.

It is particularly important to note that a virtual link with a BAG equal to 128 ms is as expensive for the network, for example as a virtual link with a BAG equal to 4 ms (if the jitter is less than 2). This is due to the 1 term in the formula 1+int(Jitter+T)/BAG).

In another advantageous embodiment of the process according to the invention, an incremental approach is used in which the virtual links are added one by one, checking that the behavior of the complete network remains deterministic after adding a virtual link.

Aggregation of Virtual Links

One possible optimization to overcome the disadvantage described above is to aggregate several virtual links to form a single super-virtual link that will be used as a basis in the non-congestion calculation.

Aggregation refers to the fact that several virtual links with a large BAG can be re-regulated with a lower BAG value, such that the low speed virtual links behave like a single higher speed virtual link.

Figure 8A:
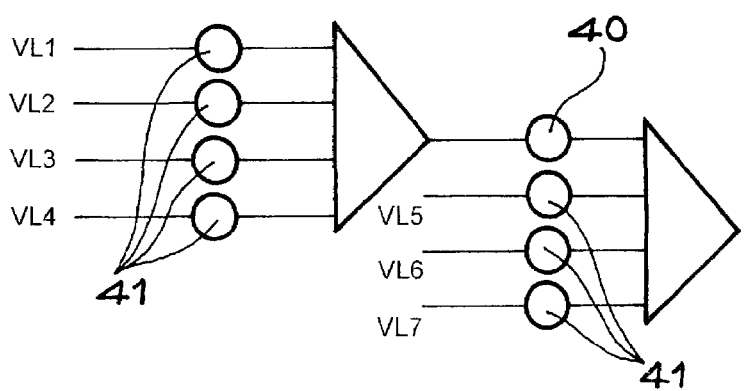
FIGS. 8A and 8B illustrate an example aggregation of virtual links.

FIG. 8A illustrates an example. There are four virtual links VL1, VL2, VL3 and VL4 with BAG=2 ms and three virtual links VL5, VL6 and VL7 with BAG=8 ms.

The first 40 of the seven regulators 41 acts as a smoother for the virtual links with BAG=8 ms. Since the 0.5 ms jitter is guaranteed for the output flow from this regulator, the virtual links with BAG=8 ms also have the same jitter value. On the other end, it is clear that this model generates more latency for virtual links with BAG=8 ms.

To make smoothing possible, the non-saturation condition of the first regulator needs to be satisfied.

Number of virtual links to be smoothed×BAG smoothing≤min (BAG$_{virtual\ link}$).

Figure 8B:
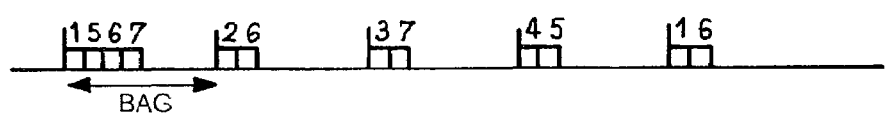

This aggregation of virtual links does not cause any loss of segregation. With these three virtual links, a packet flow illustrated in FIG. 8B can be achieved with the indicated numbers being the numbers for the virtual links.

Therefore, with the process according to the invention, it is quite possible to have a large number of virtual links while keeping the mentioned non-congestion property.

Figure 9:
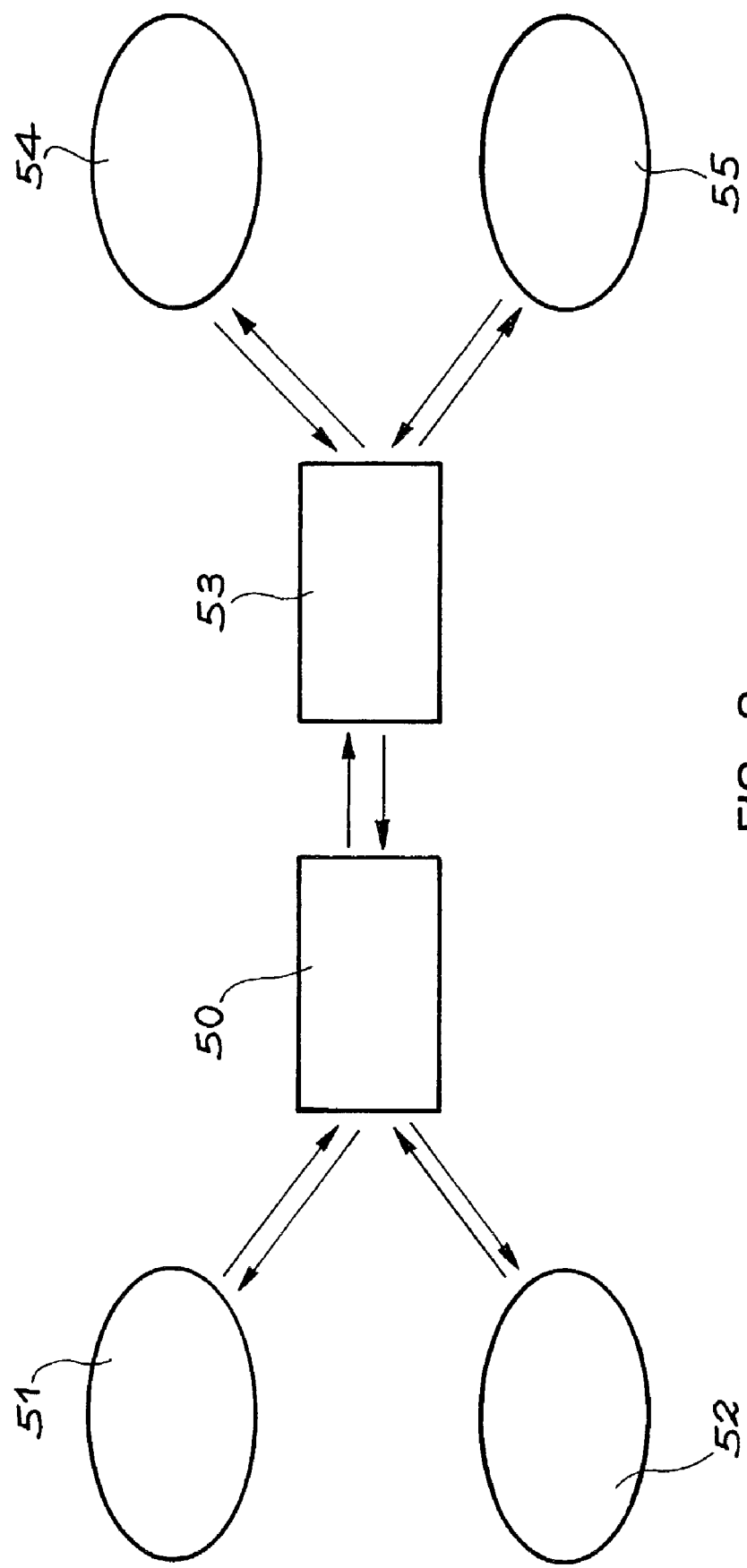
FIG. 9 illustrates an example embodiment in avionics.

FIG. 9 illustrates an example embodiment for use of the process according to the invention in avionics. In this example, a first switch 50 is connected firstly to a first graphic screen 51 (flight parameters) and to a second graphic screen (flight and maintenance parameters), and secondly to a second switch 53 itself connected to a flight parameters generator 54 and an aircraft maintenance computer 55.

REFERENCES

[1] "Queuing delays in rate controlled networks" by Barnejea and S. Keshav (Proceedings of IEEE INFOCOM'93, pages 547-556, San Francisco, Calif., April 1993).
[2] "A calculus for network delay" by R. Cruz (Part 1 Network elements in isolation. IEEE Transaction of Information Theory, 37(1), pages 121-141, 1991).
[3] "A calculus for network delay" by R. Cruz (Part II: Network analysis. IEEE Transaction of Information Theory, 37(1), pages 121-141, 1991).

What is claimed is:

1. In a packet switching network in avionics comprising at least a source subscriber station and a destination subscriber station connected to each other through at least one switch having at least one output port, a method for checking a particular service quality in terms of information routing guarantee in said network, said method comprising:
   a) determining for each output port of each switch:
      1) a maximum latency comprising a maximum residence time in an output buffer of the switch; and
      2) a value defined by the relationship:

$$\sum \left[1 + \text{int}\left(\frac{(\text{Jitter In})_i i + \text{max Latency}}{BAGi}\right)\right] * (\text{max frame duration}) \leq \text{max latency}$$

$i$ = number of virtual links passing through the buffer wherein;
   BAGi is a minimum time between two consecutive frames belonging to a vertical link i, before said frames are transmitted on a physical support,
   (Jitter In)i is Jitter associated with a virtual link i that represents a time interval between a theoretical instant at which a frame is transmitted, and its effective transmission which may be before or after the theoretical instant,
   (max frame duration) i is a duration of the longest frame on the virtual link i,
   b) comparing said value with said maximum latency; and
   c) guaranteeing that such a network has a deterministic behavior, in the sense that any packet sent on the network from a source node reaches the destination node(s) within a duration that is limited in time, if, for each switch, said value does not exceed said maximum latency.

2. In a packet switching network in avionics comprising at least a source subscriber station and a destination subscriber station connected to each other through at least one switch having at least one output port, a method for checking a particular service quality in terms of information routing guarantee in said network, said method comprising:

A) For a number i of virtual links which are added one by one:
  a) determining, for each output port of each switch:
    1) a maximum latency comprising a maximum residence time in an output buffer of the switch; and
    2) a valued defined by the relationship:

$$\sum_{i\,=\,\text{number of virtual links passing through the buffer}} \left[1 + \text{int}\left(\frac{(\text{Jitter In})_i i + \text{max Latency}}{BAGi}\right)\right] * (\text{max frame duration}) \leq \text{max latency}$$

wherein;
  BAGi is a minimum time between two consecutive frames belonging to a vertical link i, before said frames are transmitted on a physical support,
  (Jitter In)i is Jitter associated with a virtual link i that represents a time interval between a theoretical instant at which a frame is transmitted, and its effective transmission which may be before or after the theoretical instant,
  (max frame duration)i is a duration of the longest frame on the virtual link i, b) comparing said value with said maximum latency; and
  c) guaranteeing that such a network has a deterministic behavior, in the sense that any packet sent on the network from a source node reaches the destination node(s) within a duration that is limited in time, if, for each switch, said value does not exceed said maximum latency;
B) step A is done again if the number of virtual links is not completed.

* * * * *